United States Patent [19]

Sterner et al.

[11] Patent Number: 5,124,170
[45] Date of Patent: Jun. 23, 1992

[54] CONCENTRATED FROZEN LEGUMINOUS PRODUCTS

[76] Inventors: Mark M. Sterner, 11522 Doverwood; Mark H. Sterner, 5553 Wentworth Ave., both of Riverside, Calif. 92505

[21] Appl. No.: 747,527

[22] Filed: Aug. 20, 1991

Related U.S. Application Data

[63] Continuation of Ser. No. 477,576, Feb. 8, 1990, abandoned.

[51] Int. Cl.$^5$ ................................................ A23B 9/10
[52] U.S. Cl. ...................................... 426/634; 426/524
[58] Field of Search ............... 426/589, 634, 628, 524, 426/393

[56] References Cited

U.S. PATENT DOCUMENTS

| | | | |
|---|---|---|---|
| 3,415,664 | 12/1968 | Montgomery | 426/509 |
| 3,635,728 | 1/1972 | Rockland | 426/634 |
| 3,869,556 | 3/1975 | Rockland | 426/509 |
| 3,881,033 | 4/1975 | Steele | 426/460 |
| 4,335,584 | 6/1982 | Lermuzeaux | 426/524 |
| 4,676,990 | 6/1987 | Huffman | 426/634 |
| 4,900,578 | 2/1990 | Bakker | 426/634 |

OTHER PUBLICATIONS

Zelayeta 1962 Elena's Secrets of Mexican Cooking Prentice-Hall, Inc Englewood Cliffs, N.J. p. 106.

*Primary Examiner*—Carolyn Paden
*Attorney, Agent, or Firm*—Stetina and Brunda

[57] ABSTRACT

Frozen leguminous food products and a method for preparing the same are disclosed. The process comprises the steps of cleaning the legumes, removing all unwanted material, tempering the legumes until they are partially but evenly hydrated, steam cooking the legumes in direct injected live steam, crushing the legumes between rolls, forming the legumes into nuggets, and quick freezing the resultant nuggets. The nuggets are generally cube shaped and measure approximately ⅜ inch on a side. They contain 50–65% solid food product. The disclosed process eliminates the possibility of scorching during slow cooking as is common in the prior art. The disclosed process also results in a finished product which, when reconstituted, has the color and aroma of a food product prepared from fresh legumes.

12 Claims, 2 Drawing Sheets

CONCENTRATED FROZEN LEGUMINOUS PRODUCTS

This application is a continuation of application Ser. No. 07/477,576, filed Feb. 8, 1990, which is now abandoned.

FIELD OF THE INVENTION

The present invention relates generally to food products and more particularly to concentrated frozen leguminous food products and a process for preparing the same. The process comprises the steps of cleaning the legumes, removing all unwanted material, tempering the legumes until they are partially hydrated, steam cooking the legumes in direct injected live steam, crushing the legumes between rolls, forming the legumes into nuggets, and quick freezing the resultant nuggets. The nuggets are generally cube shaped and measure approximately ⅜ inch on a side. They contain 50–65% solids and 35–50% moisture. The disclosed process eliminates the possibility of scorching during slow cooking as is common in the prior art. The disclosed process also results in a finished product which, when reconstituted, has the color and aroma of a food product prepared from fresh legumes.

BACKGROUND OF THE INVENTION

Soups produced from frozen leguminous concentrates are well known in the food service industry. Frozen leguminous concentrates offer the chef a product whose use results in a considerable time savings over making soup from scratch.

Frozen leguminous concentrates were first manufactured by mixing the leguminous product with water, seasonings, gums, modified starch, and the like, and cooking until sufficient water was evaporated to provide a concentration of 25–30% solids. The concentrate was subsequently frozen in half-gallon plastic containers which could then be distributed to outlets within the food service industry. Thawing the concentrate required considerable time. Furthermore, it was necessary to thaw a minimum of one container for use. A chef could then thaw and reconstitute the frozen leguminous concentrate prior to serving.

During the concentrating phase of the above process there is a constant danger of scorching the product. The potential for scorching resulted in a process being developed for preparing leguminous products such as split peas in which there is no danger of burning the product. In this second process dry powdered legumes were prepared by subjecting the raw legumes to live steam at 15 psig for 15 minutes. The steamed legumes were then ground to a fine powder which could be added to a separate batch of legumes which were being cooked according to the first process. The powder provided additional solid material, thus greatly increasing the concentration of the product. The use of a powdered leguminous product eliminated the need for long term simmering, thus greatly reducing the probability of scorching the product. While this process virtually eliminated the potential for scorching, it produced products having undesirable characteristics. For example, peas prepared according to this process have an acceptable but undesirable brown/green color instead of the bright yellow/green color of peas prepared by the first process. Peas produced according to this second process have an undesirable overcooked smell, whereas peas produced by the first process have a desirable fresh pea aroma.

Therefore, it would be desirable to provide a process which would allow the convenience of thawing any quantity desired and which eliminates the possibility of burning while maintaining the desired color and aroma of the final product. As such, although the prior art has recognized to a limited extent the problem of scorching leguminous food products during processing and of providing a product having the desired characteristics, the proposed solutions have to data been ineffective in producing a satisfactory remedy.

SUMMARY OF THE INVENTION

The present invention specifically addresses and alleviates the above-mentioned dificiencies. More particularly, the present invention comprises concentrated frozen leguminous products and a process for preparing the same. The process comprises the steps of cleaning the legumes, removing all unwanted material, tempering the legumes until they are partially hydrated, steam cooking the legumes in direct injected live steam, crushing the legumes between rolls, mixing in seasonings, gums and modified starch if desired and forming the legumes into nuggets, and quick freezing the resultant nuggets. The nuggets are generally cube shaped and measure approximately ⅜ inch on a side. They contain 50–65% solids and 35–50% moisture. The disclosed process eliminates the possibility of scorching during preparation. The disclosed process also results in a concentrated product which is quickly prepared in small or large quantities as needed, and which has the color and aroma of a food product made from fresh legumes. These, as well as other futures advantages will be more apparent from the following description and drawings. It is understood the changes in the specific structure shown and described may be made within the scope of the claims without departing from the spirit of the invention.

DETAILED DESCRIPTION OF THE PREFERRED EMBODIMENT

The process for preparing concentrated frozen leguminous products of the present invention is illustrated in FIGS. 1 through 4 which depict a presently preferred embodiment of the invention.

Figure 1:
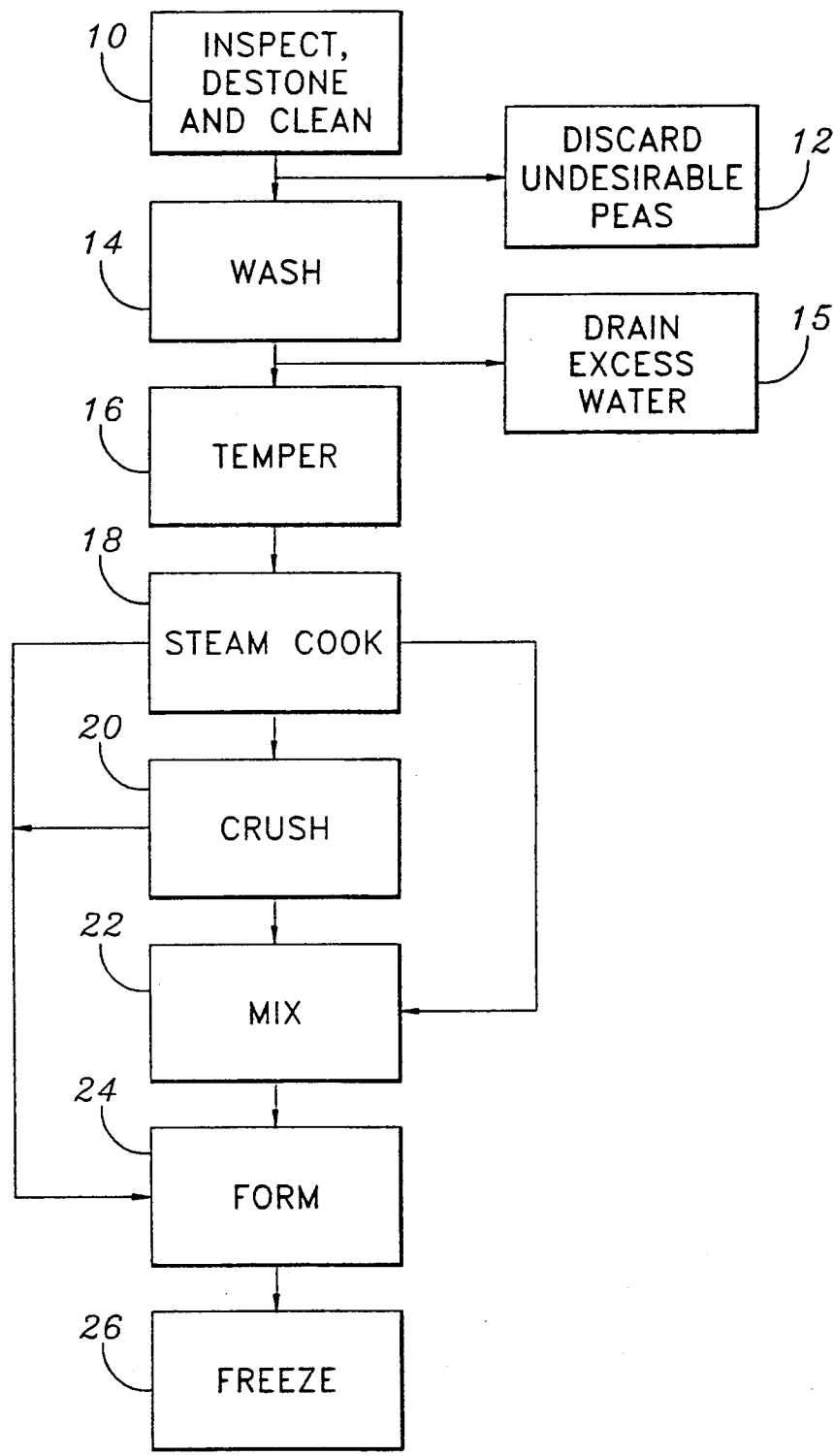
FIG. 1 is a flow chart illustrating the sequence of operations performed in the practice of the method of the present invention.

Referring now to FIG. 1, the method of the present invention comprises the steps of inspecting and cleaning, washing, tempering, steam cooking, crushing, mixing, forming, and freezing to provide a concentrated leguminous food product having, when reconstituted, the aroma and color of the original product. Prior art concentrating processes result in a final product having approximately 25–30% solids. The concentrating process of the present invention results in a more concentrated product having a solids concentration of 40-75% by weight, and preferably a concentration of approximately 50-65% solids. The process can be practiced upon various food products such as hummus, dahl, and refried beans. In the preferred embodiment split peas are used as an example food product, however, those skilled in the art will recognize that the process of the present invention need not be limited to split peas.

Referring now to FIG. 1, the following discussion of the individual steps of the process will be useful in understanding the present invention.

INSPECTING, DE-STONING, AND CLEANING

The initial inspection, de-stoning, and cleaning 10 of the legumes is carried out manually or automatically in accordance with known methods in the art. Undesirable or substandard legumes are discarded 12.

WASHING

Following inspection, de-stoning, and cleaning 10 the legumes are washed 14 with water or any acceptable liquid capable of removing foreign material such as dirt and pesticide. After washing, the legumes are drained 15 and the excess water is discarded.

TEMPERING

Green or yellow split peas are emersed in water for a period of approximately forty-five minutes until they become approximately 150-160% of their original dry weight. The water is drained and the peas are set aside and let stand for two hours to allow the moisture to equilibriate throughout the split peas. Such period of equilibriation is referred to as "tempering" 16. When this is done, the pea is somewhat rubbery throughout whereas if they were not allowed to equilibriate the core would still be hard. Although the pea does not have to be fully hydrated, i.e., contain as much moisture as possible, it must be at least partially hydrated and must be evenly equilibriated. As those skilled in the art will recognize, various other legumes require different soaking and equilibriation times.

STEAMING

The legume is steamed or pressure cooked 18 with direct injected live steam generally under approximately 0-15 psig. The legumes must be cooked sufficiently to soften it enough so that it may be formed into the desired shape. The steam cooked legume is directly formed into the desired shape. That is, the legume is not subjected to further cooking, i.e. simmering as in the prior art. The cooking may be done in a rotary steam cooker such as is depicted in FIG. 2 or a continuous screw steam cooker such as is depicted in FIG. 3.

Peas are cooked at approximately atmospheric to 0.5 psig for approximately twelve minutes. Those skilled in the art will recognize that other pressures and times will be optimal for other legumes.

Figure 2:
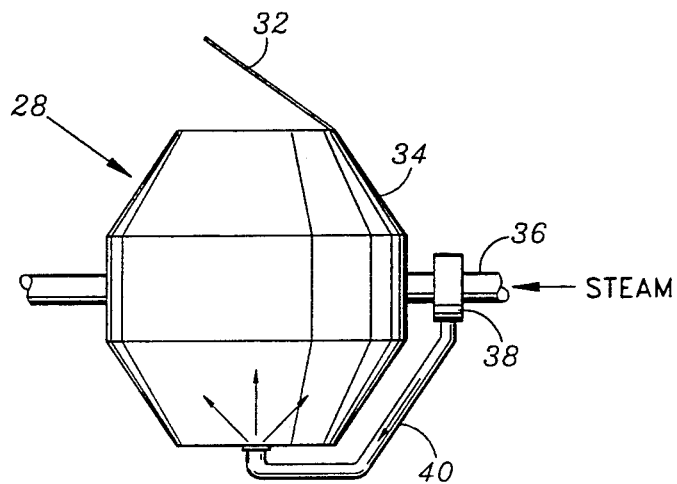
FIG. 2 is a front plan view of a rotary steam cooker as may be used in the practice of the method of the present invention.

The rotary steam cooker 28 depicted in FIG. 2 typically has a capacity of approximately fourteen cubic feet and rotates the food product contained therein to assure even and thorough cooking. Live steam is provided to input and support 36 from which it travels through coupling 38 and tube 40 into housing 34. Lid 32 provides a means for placing the food product into and removing the food product from the rotating steam cooker. The steam cooker is typically alternatively supplied with steam and then rotated. Injection of steam into the housing 34 when the rotary steam cooker 28 is in the upright position, with the lid uppermost, ensures even distribution of the steam throughout the food product. Subsequent rotation of the rotary steam cooker 28 mixes the product to further ensure uniform heat distribution.

Figure 3:
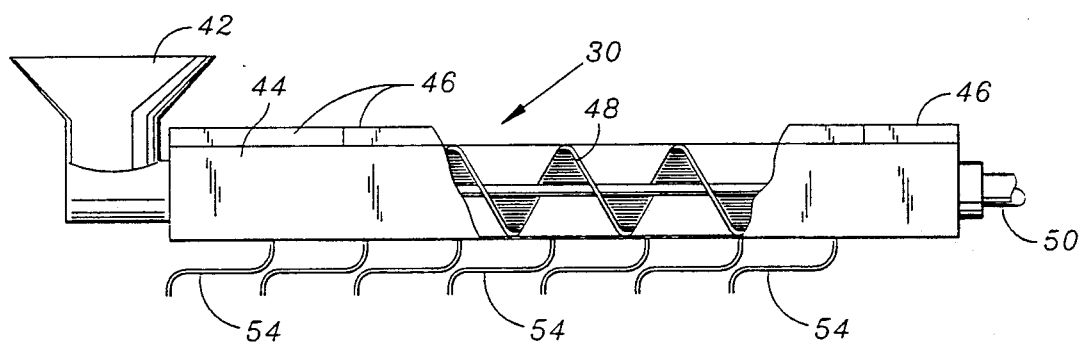
FIG. 3 is a front plan view of a continuous screw steam cooker as may be used in the practice of the method of the present invention.
Figure 4:
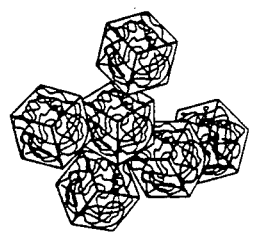
FIG. 4 is a perspective view of the leguminous food product produced by the practice of the method of the present invention.

The continuous screw cooker 30 illustrated in FIG. 3 provides a steady output as opposed to the batch process of the rotatable steam cooker 28 of FIG. 2. Continuous screw steam cooker 30 is used by placing the food product into the hopper 42 from which it is carried by screw 48 through housing 44 toward outlet 50. Steam is supplied to the housing 44 through tubes 54 and contained therein by doors 46. Doors 46 provide access to the interior of housing 44 for cleaning and maintenance. Seasonings or other ingredients may be added to the legumes in the cooker, and/or in the mixer.

CRUSHING

The legume is crushed 20 between rolls or can alternatively be passed on to the next step without being crushed. The crushing step crushes the legumes into flakes having a thickness between 0.001 and 0.010 inches and preferably a thickness of approximately 0.006 inches. This step is beneficial because it provides a food product which suspends well in a reconstituted soup.

MIXING

The legume is then mixed 22 with seasonings and/or other ingredients or can alternatively be passed on to the step of forming without mixing.

FORMING

The mixture of legumes is formed 24 into nuggets or cubes which are approximately ⅜ inch long on each side. Forming 24 is generally accomplished by extruding the concentrated leguminous product through a square die or opening. The resulting product has a square cross section and may be cut or broken up to form cubes.

FREEZING

The cubes are quick frozen 26 in the desired shape by either a cryogenic or refrigerator means. In the preferred embodiment, cubes are cryogenically frozen by passing them through a cylindrical freezer tunnel where they are tumbled in a drift of $CO_2$ snow. As they tumble, each cube is frozen to approximately 20 degrees Fahrenheit. After packaging they are placed in a holding freezer until they reach a temperature of approximately 0 degrees Fahrenheit where they are stored prior to shipping.

It is understood that the exemplary concentrated frozen leguminous products and method for making the same described herein and shown in the drawings represents only a presently preferred embodiment of the invention. Indeed, various modifications and additions may be made to such embodiment without departing from the spirit and scope of the invention. For example, various types of cooking apparatus may be used to cook the leguminous food product with live steam. Also, various means other than extrusion may be used to form the leguminous food product into the desired shape prior to freezing. Indeed, the desired shape need not be cube or nugget like; the desired shape could be in the form of a ribbon or cylinder or some other shape. Thus, these and other modifications and additions may be obvious to those skilled in the art and may be implemented to adapt the present invention for use in a variety of different applications.

What is claimed is:

1. A method for forming a concentrated leguminous food product for reconstitution into a ready to eat food product, the method comprising the steps of:
   a. tempering the food product sufficiently to allow moisture to equilibrate throughout the food product;
   b. cooking the food product in a steam environment, the amount of cooking being sufficient to soften the food product such that it can be directly formed into a desired shape;
   c. forming the steamed food product into the desired shape; and
   d. freezing the food product in the desired shape.

2. The process as recited in claim 1 wherein the step of tempering the food product prior to the step of steam cooking the food product comprises:
   a. immersing the food product in water, the immersion time being sufficient to allow a portion of the water to be absorbed into the food product;
   b. draining the excess water from the food product; and
   c. allowing the food product to stand, the standing time being sufficient to allow moisture to equilibrate throughout the food product.

3. The process as recited in claim 2 further comprising the step of crushing the food product prior to the step of forming the food product into a desired shape.

4. The process as recited in claim 3 wherein the step of crushing the food product further comprises crushing the food product by passing it between rolls such that the food product is crushed to a thickness of between 0.001" and 0.010".

5. The process as recited in claim 2 further comprising the step of mixing other edible items with the food product prior to the step of forming the food product into a desired shape.

6. The process as recited in claim 2 wherein step of cooking the food product comprises cooking the food product within a rotating steam cooker.

7. The process as recited in claim 2 wherein the step of cooking the food product comprises cooking the food product within a continuous screw steam cooker.

8. The process as recited in claim 2 further comprising the steps of:
   a. inspecting, de-stoning, and cleaning the food product to remove undesirable peas and foreign objects; and
   b. washing the food product to remove dirt.

9. The process as recited in claim 2 wherein the food product is immersed into the water for a period of approximately 45 minutes until the food product becomes approximately 150%-160% of its original dry weight, and is let stand for two hours after the excess water is drained therefrom to allow the moisture to equilibrate therein.

10. A method for forming a concentrated leguminous food product for quick reconstitution into a ready to eat food product, the method comprising the steps of:
    a. inspecting the legumes to identify any undesirable legumes and foreign matter;
    b. discarding any undesirable legumes and foreign matter;
    c. washing the legumes to remove soil and pesticides;
    d. tempering the legumes sufficiently to allow moisture to equilibrate throughout the legumes;
    e. cooking the legumes in a steam environment, the amount of cooking time being sufficient to soften the legumes such that they can be directly formed into a desired shape;
    f. crushing the cooked legumes to a thickness of between 0.001 inches and 0.010 inches;
    g. forming the crushed legumes into nuggets; and
    h. freezing the nuggets.

11. The method as recited in claim 10 wherein the step of freezing the nuggets comprises cryogenically freezing the nuggets by disposing the nuggets within a container in which the nuggets are tumbled in contact with frozen $CO_2$ particles.

12. The method as recited in claim 11 further comprising the step of mixing the legumes with other food products prior to the step of forming the legumes into nuggets.

* * * * *